United States Patent [19]

Meniconi

[11] 4,181,164
[45] Jan. 1, 1980

[54] HEADSTOCK FOR A PANEL CUTTING MACHINE

[76] Inventor: Alberto Meniconi, Loc. Bellavista 48, Poggibonsi (SI), Italy

[21] Appl. No.: 911,421

[22] Filed: Jun. 1, 1978

[30] Foreign Application Priority Data

Jun. 7, 1977 [IT] Italy .............................. 9477 A/77

[51] Int. Cl.$^2$ .......................... B27C 5/00; B27C 9/04
[52] U.S. Cl. ................................... 144/3 R; 144/41; 144/136 R; 144/326 R; 409/228
[58] Field of Search ............... 144/1 R, 2 R, 3 R, 39, 144/41, 134 R, 136 R, 323, 326 R; 90/18

[56] References Cited

U.S. PATENT DOCUMENTS

| 13,342 | 7/1855 | Walcott | 144/39 |
|---|---|---|---|
| 3,421,556 | 1/1969 | Clifford | 144/39 |
| 4,058,150 | 11/1977 | Pennington | 144/136 R |

*Primary Examiner*—Robert L. Spruill
*Assistant Examiner*—W. D. Bray
*Attorney, Agent, or Firm*—McGlew and Tuttle

[57] ABSTRACT

A headstock of a panel cutting machine for cutting panels having a laminate, and particularly wood panels having a plastic laminate comprising, a conveyor for feeding a panel in a feed direction on a feed path, a rotatably mounted panel cutting device disposed in the feed path for cutting the panel and a rotatably mounted laminate cutting device disposed in the feed path in front of the panel cutting device in the feed direction and in alignment with the panel cutting device for cutting the laminate of the panel. A panel cutting drive is connected to the panel cutting device for rotating the panel cutting device and a laminate cutting drive is connected to the laminate cutting device for rotating the laminate cutting device in a direction opposite from the rotation of the panel cutting device and tangentially in the feed direction. A pressure device is connected to the laminate cutting device for biasing it downwardly at a selected pressure onto the panel.

9 Claims, 3 Drawing Figures

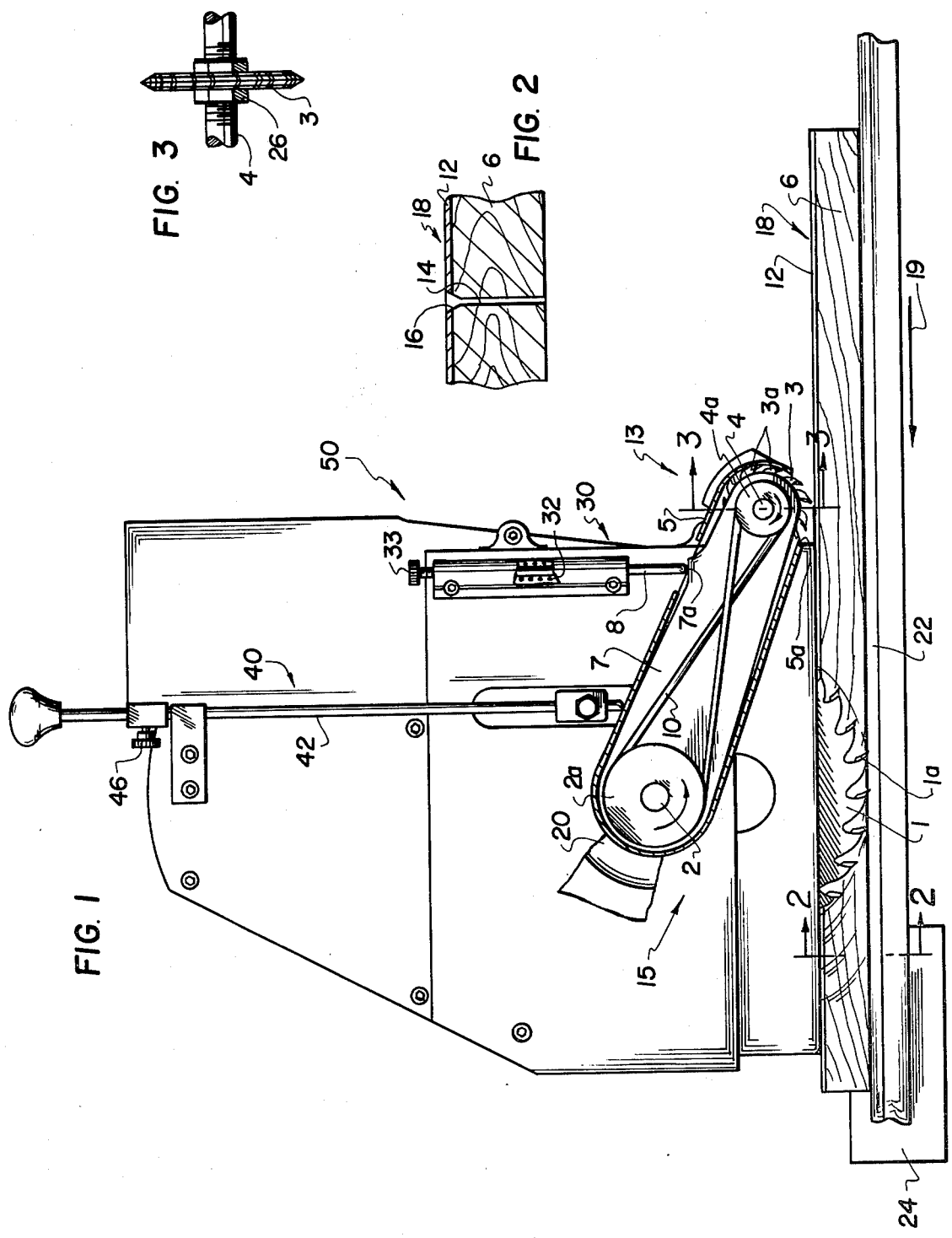

HEADSTOCK FOR A PANEL CUTTING MACHINE

FIELD OF THE INVENTION

This invention relates in general to panel cutting machines and, in particular, to a new and useful head stock for a panel cutting machine for cutting panels having a laminate and particularly for cutting wood panels having a plastic laminate.

DESCRIPTION OF THE PRIOR ART

Various devices are known for cutting panels of various materials into selected sizes to be used in construction. The panels cut to various sizes and shapes are used as construction elements. Materials for the panels include plywood, agglomerates and the like. Panels are often covered or laminated with laminates of various materials including polyurethane, polystyrene and other artificial plastic materials. Other materials used for forming these laminates also include cement, asbestos and similar materials.

Problems arise when panels having laminates particularly wood panels having plastic laminates, are to be cut in that the laminate must be specially treated to provide edges at selected angles or bevelled edges which can only be achieved by successively trimming or rectifying the cutting edges resulting when the panel is cut by the disc blade of a circular saw construction. The subsequent trimming operation results in time and material lost and generally renders the operation of cutting the panel with a laminate expensive and inefficient.

SUMMARY OF THE INVENTION

An object of the present invention is to provide a headstock for a panel cutting machine especially for cutting panels having a laminate and particularly wood panels having plastic laminates, which, in a single cutting action, is effective to cut the panel and trim the edges of the laminate to the desired configuration. This results in an increase in efficiency and a reduction in the time required to make such a cut. The advantageous result is achieved by combining a circular saw construction for cutting the body of the panel with a laminate cutting tool such as a scribing or milling device which has a rotatably mounted bit that is in alignment with the disc blade of the circular saw construction and just ahead of the disc blade in the cutting path. The lmainate cutting tool inscribes an incision into the laminate face of the panel in advance of the circular saw construction which corresponds with the cut to be made by the circular saw construction. This laminate cut or incision is of a depth at least as thick as the laminate itself so that the laminate is cut, trimmed and bevelled before the disc blade of the circular saw construction cuts the remaining portion of the panel.

Accordingly another object of the present invention is to provide a headstock of a panel cutting machine for cutting panels having a laminate particularly wood panels having a plastic laminate comprising conveyor means for feeding a panel with a laminate in a feed direction on a feed path, panel cutting means rotatably mounted and disposed in the feed path for cutting the panel, panel cutting drive means connected to said panel cutting means for rotating said panel cutting means and cutting the panel, laminate cutting means rotatably mounted and disposed in the feed path in front of and in alignment with said panel cutting means in the feed direction for cutting and trimming the laminate of the panel, laminate cutting drive means connected to said laminate cutting means for rotating said laminate cutting means, and laminate cutting pressure means connected to said laminate cutting means for biasing said laminate cutting means at a selected pressure downwardly onto the panel.

A further object of the present invention is to provide a headstock for a panel cutting machine which includes a circular saw construction for cutting a panel and a milling machine construction for milling or scribing the laminate of the panel in alignment with and in front of the circular saw construction in a direction and path of feed of the panel.

A further object of the present invention is to provide a woodstock for a panel cutting machine for cutting laminated panels which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 1 is a side elevational view partly in section of a headstock for a panel cutting machine in accordance with the invention;

FIG. 2 is a view taken along the line 2—2 of FIG. 1 showing the cut made by the headstock in a laminated panel; and FIG. 3 is a fragmentary detailed view taken along the line 3—3 of FIG. 1 showing alignment adjustment means connected to the laminate cutting device.

DESCRIPTION OF THE PREFERRED EMBODIMENT

Turning now to the specific embodiment of the invention selected for illustration in the drawings, and referring to FIG. 1, a headstock for a laminated panel cutting machine is shown and generally designated 50. The headstock comprises a circular saw construction generally designated 15 which comprises a disc blade 1 rotatably mounted on a shaft 2 and driven by a motor 20 in a conventional manner. A laminated panel generally designated 18 comprises a wood panel portion 6 having a laminated covering of plastic 12 secured to the top face thereof. Panel 18 is connected to conveyor table 22 which is advanced in the direction of arrow 19 by feed means 24. Table 22 and feed means 24 comprise a conventional conveyor means for advancing the panel 18 in a feed direction 19 on a feed path intersected by the disc blade 1. The circular saw construction 15 can be replaced by any known panel cutting means for cutting the panel 18. In front of the circular saw construction 15 with respect to the feed direction 19, a laminate cutting means generally designated 13 is disposed which comprises a laminate cutting tool or milling blade 3 rotatably mounted on a shaft 4.

Referring to FIG. 2 laminate cutting tool 3 cuts an incision 16 in the laminate 12 to at least the depth of the laminate 12 and possibly slightly beyond it into the panel 6, and disc blade 1 cuts a standard rectilinear cut 14 into the portion 6 of the panel 18. Laminated panel 18 is thus cut simultaneously with the trimming and cutting of its laminate 12.

Laminate cutting tool 3 is mounted for rotation in a direction opposite from the rotation of disc blade 1 through a laminate tool pulley 4a mounted on shaft 4, a cross belt 10 and pulley 2a mounted on shaft 2 and rotated by motor 20. The diameter of the laminate cutting tool 3 is advantageously smaller than that of the disc saw 1. Laminate cutting tool 3 includes a plurality of milling teeth which have a profile which is at least as thick as the width of teeth 1a of the disc blade 1. The profile of milling teeth 3a is preferably in the form of a triangle which cuts an inverted triangular groove (16 in FIG. 2) that later connects with the cut (14 of FIG. 2) made by the circular saw 1. The making of the triangular cut 16 by the laminate cutting tool 3 before the making of the cut 14 by the disc blade 1 provides the proper trimming and bevelling of the laminate 12 before the panel 18 is finally cut into its desired size.

A housing 5 is provided around the laminate cutting means 13 which includes a slit 5a positioned adjacent the panel 18, through which the laminate cutting tool 3 extends to engage with the panel 18. The desired depth of the cut 16 made by the tool 3 is adjusted by adjustment means generally designated 40 which includes a shaft 42 that abuts against the top of housing 5. A plate 7 on which shaft 4 with pulley 4a is rotatably mounted, is itself rotatably mounted on shaft 2. A laminate cutting pressure means generally designated 30 is provided with a spring loaded member 8 biased downwardly by spring 32 onto a platform 7a of the plate 7. The pressure of member 8 on platform 7a can be adjusted by set screw 33 to advantageously bias the plate 7 downwardly and engage laminate cutting tool 3 with the panel 18 at a selected pressure. Such pressure adjustment is necessary and desirable to apply a desired pressure on the tool 3 which pressure is dependent on the material used for making the laminate 12.

In operation the conveying means 22, 24 feeds the panel 18 in the feed direction 19. Laminate cutting tool 3a then forms a precut or pre-incision in the panel 18 to a depth at least as great as the thickness of the laminate 12. Panel 18 then progresses through the disc blade 1 where it is cut to its remaining depth. The operation results in the cutting of panel 18 and the simultaneous trimming and bevelling of laminate 12.

In FIG. 3 an alignment adjusment means 26 is shown which is for example, two nuts threaded on shaft 4 around the milling blade 3. This adjustment is used to insure a co-alignment between disc blade 1 and milling blade 3 in the feed path of panel 18.

While a specific embodiment of the invention has been shown and described in detail to illustrate the application of the principles of the invention, it will be understood that the invention may be embodied otherwise without departing from such principles.

The invention is advantageously exploitable in industry by providing an inexpensive and efficient means of cutting laminated panels in one operation which conserves energy and time. In view of the widespread use of laminated panels in for example building construction, furniture manufacture, and resurfacing fields, the present invention has widespread uses in industry.

What is claimed is:

1. A headstock of a panel cutting machine for cutting panels having a laminate, said headstock comprising: conveyor means for feeding a laminated panel in a feed direction on a feed path; a first shaft perpendicular to said path; panel cutting means comprising a disc blade rotatably mounted on said shaft and disposed in and aligned with said feed path of cutting the panel; panel cutting drive means comprising a motor connected to said panel cutting means for rotating said panel cutting means and cutting the panel; a second shaft parallel to said first shaft; rotary laminate cutting means comprising a rotary milling blade rotably mounted on said second shaft and disposed in the feed path in front of said panel cutting means in said feed direction and in alignment with said panel cutting means for cutting the laminate of the panel; laminate cutting drive means connecting said motor to said laminate cutting means for rotating said laminate cutting means in a direction to cut in towards said panel and tangentially in the same direction as the feed direction of said panel; support means pivotally mounted on said first shaft of said motor to support said second shaft of said laminate cutting means; and laminate cutting pressure means connected to said laminate cutting means for biasing said laminate cutting means at a selected pressure onto the exposed surface of said laminate to cut through said laminate.

2. A headstock of a panel cutting machine according to claim 1, further including an alignment adjustment means connected to said laminate cutting means for displacing said laminate cutting means in a direction perpendicular to said panel feed direction to adjust the alignment of said laminate cutting means to be in alignment with said panel cutting means.

3. A headstock of a panel cutting machine according to claim 1, wherein said panel cutting means is rotated in a direction opposite to said laminate cutting means and said laminate cutting means is rotated tangentially in the same direction as the feed direction of the panel.

4. A headstock of a panel cutting machine according to claim 1, wherein said laminate cutting drive means comprises a cross belt engaged around said first and second shaft to rotate said milling blade in a direction adjacent the panel which is tangentially the same as said feed direction of the panel, and in a direction opposite from the rotation of said disc blade.

5. A headstock of a panel cutting machine according to claim 1, wherein the diameter of said milling blade is smaller than the diameter of said disc blade and wherein said milling blade includes a plurality of teeth for cutting the laminate of a thickness greater than the thickness of said disc blade.

6. A headstock of a panel cutting machine according to claim 5, wherein the profile of said teeth of said milling blade are triangular.

7. A headstock of a panel cutting machine for cutting panels having a laminate, said headstock comprising: conveyor means for feeding a laminated panel in a feed direction on a feed path; panel cutting means comprising a disc blade rotatably mounted on a first shaft and disposed in said feed path for cutting the panel; panel cutting drive means comprising a motor connected to said panel cutting means for rotating said panel cutting means and cutting the panel; laminate cutting means comprising a rotary milling blade mounted on a second shaft spaced from said first shaft and disposed in the feed path in front of said panel cutting means in said feed direction and in alignment with said panel cutting means for cutting the laminate of the panel; a plate rotatably mounted on said first shaft of said disc blade, said second shaft with said milling blade being rotatably mounted on said plate; laminate cutting drive means connected to said laminate cutting means for rotating said laminate cutting means; and laminate cutting pressure means comprising a spring loaded member engaged with said plate for biasing said plate and said milling blade thereon downwardly at a selected pressure onto the panel.

8. A head stock of a panel cutting machine according to claim 7, further including a housing disposed around said plate and said first and second shafts having a slit adjacent the milling blade for exposing a portion of the milling blade to a panel and a depth adjustment means engageable with the casing for adjusting the casing with the milling blade toward and away from a panel to adjust the depth of the cut of said milling blade to a depth of at least the thickness of the laminate.

9. A headstock of a laminated panel cutting machine comprising, a conveyor table for advancing a panel in a feed direction on a feed path, a circular saw having a disc blade rotatably mounted and disposed in the feed path for cutting the panel, said disc blade being mounted on a shaft, a motor for driving said disc blade shaft, a plate pivotally mounted on said disc blade shaft, a laminate cutting tool rotatably mounted on said plate and disposed in the feed path in advance of said disc blade in the feed direction and in alignment therewith for cutting the laminate of the panel, a cross belt connected between said disc saw shaft and said laminate cutting tool for rotating said laminate cutting tool in a direction opposite from the rotation of said disc saw and in a direction adjacent a panel tangentially the same as the feed direction of the panel, a spring loaded member engaged with said plate for biasing said plate with said laminate cutting tool toward the panel to be cut at a selected pressure, a housing disposed around said plate and said laminate cutting tool having a slot adjacent a panel to be cut for exposing a portion of said laminate cutting tool to the panel, an adjustment means engaged with said casing for adjusting the depth of the cut of said laminate cutting tool in a panel to be cut to a depth equal to at least the thickness of the laminate, wherein a pre-incision is made in the laminate of the panel after which the panel is cut by said disc blade.

* * * * *